(12) United States Patent
Schrama et al.

(10) Patent No.: US 11,835,362 B2
(45) Date of Patent: Dec. 5, 2023

(54) DEPTH SENSING USING LINE PATTERN GENERATORS

(71) Applicant: Lumileds LLC, San Jose, CA (US)

(72) Inventors: Charles Schrama, San Jose, CA (US); Cristian Dan, San Jose, CA (US)

(73) Assignee: Lumileds LLC, San Jose, CA (US)

( * ) Notice: Subject to any disclaimer, the term of this patent is extended or adjusted under 35 U.S.C. 154(b) by 13 days.

(21) Appl. No.: 17/500,127

(22) Filed: Oct. 13, 2021

(65) Prior Publication Data

US 2022/0065624 A1 Mar. 3, 2022

Related U.S. Application Data

(63) Continuation of application No. 16/871,741, filed on May 11, 2020, now Pat. No. 11,150,088.

(Continued)

(51) Int. Cl.
| | |
|---|---|
| *G01C 3/08* | (2006.01) |
| *G06T 7/521* | (2017.01) |
| *G06T 7/70* | (2017.01) |
| *H04N 23/56* | (2023.01) |
| *G06V 10/145* | (2022.01) |

(52) U.S. Cl.
CPC ............ *G01C 3/08* (2013.01); *G06T 7/521* (2017.01); *G06T 7/70* (2017.01); *G06V 10/145* (2022.01); *H04N 23/56* (2023.01)

(58) Field of Classification Search
CPC .. G01C 3/08; G06T 7/521; G06T 7/70; G06V 10/145; H04N 23/56
See application file for complete search history.

(56) References Cited

U.S. PATENT DOCUMENTS

| 4,682,861 A | 7/1987 | Hosoya |
|---|---|---|
| 9,098,931 B2 | 8/2015 | Shpunt et al. |
| (Continued) | | |

FOREIGN PATENT DOCUMENTS

| CN | 1965590 A | 5/2007 |
|---|---|---|
| CN | 103226009 A | 7/2013 |
| (Continued) | | |

OTHER PUBLICATIONS

USPTO non-final office action, corresponding to U.S. Appl. No. 16/713,701, dated Jan. 17, 2023, 14 pages.

(Continued)

*Primary Examiner* — Mishawn N. Hunter (57) ABSTRACT

A distance measurement system includes two or more line pattern generators (LPGs), a camera, and a processor. Each LPG emits a line pattern having a first set of dark portions separated by a respective first set of bright portions. A first line pattern has a first angular distance between adjacent bright portions, and a second line pattern has a second angular distance between adjacent bright portions. The camera captures at least one image of the first line pattern and the second line pattern. The camera is a first distance from the first LPG and a second distance from the second LPG. The processor identifies a target object illuminated by the first and second line patterns and determines a distance to the target object based on the appearance of the target object as illuminated by the first and second line patterns.

20 Claims, 7 Drawing Sheets

Related U.S. Application Data (60) Provisional application No. 62/846,897, filed on May 13, 2019.

(56) References Cited

U.S. PATENT DOCUMENTS

| | | | |
|---|---|---|---|
| 9,423,246 | B2 | 8/2016 | Yu et al. |
| 10,466,360 | B1* | 11/2019 | Bardagjy .............. G01S 7/4817 |
| 11,150,088 | B2 | 10/2021 | Schrama et al. |
| 2004/0264350 | A1 | 12/2004 | Ueki et al. |
| 2007/0296920 | A1 | 12/2007 | Mezouari et al. |
| 2010/0303341 | A1 | 12/2010 | Häusler |
| 2010/0315708 | A1* | 12/2010 | Amberger .............. G02B 21/06 |
| | | | 359/389 |
| 2011/0163336 | A1 | 7/2011 | Peng et al. |
| 2014/0340484 | A1 | 11/2014 | Pfister et al. |
| 2016/0335492 | A1 | 11/2016 | Chern et al. |
| 2017/0057946 | A1 | 3/2017 | Ayyappanpillai et al. |
| 2018/0293790 | A1 | 10/2018 | Darwin |
| 2019/0049097 | A1 | 2/2019 | Rossi et al. |
| 2019/0098276 | A1 | 3/2019 | Duggan et al. |
| 2019/0131771 | A1 | 5/2019 | Wan et al. |
| 2019/0384141 | A1 | 12/2019 | Engelen et al. |
| 2021/0223568 | A1 | 7/2021 | Makinen et al. |

FOREIGN PATENT DOCUMENTS

| | | |
|---|---|---|
| CN | 210323605 U | 4/2020 |
| TW | I436030 B | 5/2014 |
| WO | 2018111423 A1 | 6/2018 |

OTHER PUBLICATIONS

USPTO Notice of Allowance, corresponding to U.S. Appl. No. 16/444,447, dated Nov. 9, 2022, 17 pages.

USPTO Non-Final Office Action in U.S. Appl. No. 16/444,447 dated Sep. 15, 2021, 9 pages.

Sabina Merlo et al., "Infrared structured light generation by optical MEMS and application to depth perception", 2017 IEEE International Workshop on Metrology for Aerospace (Metroaerospace), IEEE, Jun. 21, 2017, pp. 518-522, XP033135233.

International Search Report and Written Opinion, PCT/US2020/032416, dated Aug. 13, 2020, 11 pages.

Lilienblum et al., "A Structured Light Approach for 3-D Surface Reconstruction with a Stereo Line-Scan System", IEEE Transactions on Instrumentation and Measurement, IEEE Service Center, Piscataway, NJ, US, vol. 64, No. 5, May 1, 2015, pp. 1266-1274, XP011577379.

USPTO Final office action, corresponding to U.S. Appl. No. 16/713,701, dated Feb. 27, 2023, 17 pages.

U.S. Office Action in U.S. Appl. No. 16/444,447 dated Mar. 18, 2022, 9 pages.

\* cited by examiner

DEPTH SENSING USING LINE PATTERN GENERATORS

CROSS REFERENCE TO RELATED APPLICATIONS

This application is a continuation of U.S. application Ser. No. 16/871,741, filed May 11, 2020, which claims the benefit of and priority to U.S. Provisional Application No. 62/846,897, filed May 13, 2019, the disclosures of which are hereby incorporated by reference herein in their entireties for all purposes.

TECHNICAL FIELD OF THE DISCLOSURE

The present disclosure relates generally to depth sensing and, more specifically, to depth sensing using multiple line patterns generated by multiple line pattern generators.

BACKGROUND

Line pattern generators are used to illuminate objects in target areas with a pattern of light, e.g., visible, infrared, or ultraviolet optical radiation. Observation of an object illuminated with a pattern can be used to determine information about the object, e.g., the location or orientation of the object. Existing line pattern generators may use a light source, such as a light emitting diode (LED), combined with a grating or patterned mask, which blocks a portion of the light emitted from the light source.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

The systems, methods and devices of this disclosure each have several innovative aspects, no single one of which is solely responsible for the all of the desirable attributes disclosed herein. Details of one or more implementations of the subject matter described in this specification are set forth in the description below and the accompanying drawings.

For purposes of illustrating the depth sensing systems described herein, it might be useful to understand phenomena that may come into play in a distance measurement system. The following foundational information may be viewed as a basis from which the present disclosure may be properly explained. Such information is offered for purposes of explanation only and, accordingly, should not be construed in any way to limit the broad scope of the present disclosure and its potential applications.

Several methods exist for depth sensing using light, including stereo vision, lidar (light detection and ranging), and time of flight measurements. Stereo vision systems determine the depth to an object based on images captured by multiple cameras in different locations. Lidar and time-of-flight sensors derive distance from a time for a pulse of light to return to the sensor. Stereo visions systems can be bulky and complex, as at least two cameras at different locations are needed. Time-of-flight based approaches required high speed electronics, particularly for determining depth to objects within a short range (e.g., less than 2 meters).

Another option for depth sensing uses structured line patterns projected into a target area to produce a line pattern across objects in the target area. Structured line patterns can also be used to determine the orientation, size, and/or other features of one or more objects within the target area. Structured line patterns are produced by passing light through a grating. The light can be produced by a light emitting diode (LED), an array of LEDs, a laser, or another type of light source. For example, in double grating line pattern generators, an LED light source projects light through two gratings of equal pitch, and the light that passes through both of the gratings forms a line pattern corresponding to the grating pattern across a target area.

Some existing depth sensors use a camera and a single line pattern generator (LPG). The position of the line pattern on the target object is compared to the position of the line pattern on a background, e.g., a wall behind the target object. For example, if the line pattern is a striped pattern having a phase (i.e., the distance between two adjacent stripes), the distance to the target object can be derived from a phase difference between the line pattern on the target object and the line pattern on the background. These depth sensors may provide ambiguous or inaccurate results outside a limited range of depths because the depth sensor cannot detect when the phase between the target object and the background is offset by more than one period. An example of this ambiguity is described with respect to FIGS. 1-4.

If the size of the target object is known or has little variation, a depth sensing system can first determine an approximate distance based on the apparent size of the target object, which may overcome ambiguity in phase in an LPG-based depth sensor. However, for many depth sensing applications, the size of the target object is not known, or has enough variation that the depth results can be ambiguous. For example, the sizes of adult heads vary by as much as ±10%. A driver monitoring system (DMS) or driver attention monitor that monitors the position of a driver's head using a single-LPG based depth sensor may have ambiguous or incorrect results due to the combination of natural variation in head sizes and phase ambiguity in existing depth sensors.

Depth sensors that uses multiple LPGs, such as the depth sensors described herein, reduce this phase ambiguity and can provide accurate distance measurements across a longer range of distances, even if the size of the target object is not known. Different LPGs produce different line patterns across the target object and a background area. For example, the LPGs may be at different positions relative to a camera, the LPGs may have different angular distances between portions of the line patterns, or the LPGs may have both different positions and different angular distances. Each LPG produces a line pattern that has alternating "bright" portions and "dark" portions. As used herein, "bright" portions of a line pattern have an intensity above a threshold, and "dark" portions of a line pattern have an intensity below a threshold. For example, the bright portions have an intensity above 50% of a maximum intensity across the line pattern, and the dark portions have an intensity below 50% of the maximum intensity across the line pattern. The "bright" and "dark" portions radiate outward from an LPG. The bright portions and dark portions have a periodicity, and two adjacent bright portions or two adjacent dark portions have a consistent angular distance relative to each other across the line pattern.

The depth sensor also includes a camera to capture images of the target object illuminated by the LPGs, and a processor to analyze the captured images and determine distances to target objects. In one embodiment, the camera captures an image of the target object illuminated by one LPG, and another image of the target object illuminated by another LPG. The processor determines, in each image, a phase shift of the line pattern on the target object relative to the phase of the line pattern on a background or reference region. The processor then calculates the distance to the target object based on the two determined phase shifts. In another embodiment, the camera captures an image of the target object illuminated by two or more LPGs simultaneously. The two LPGs may generate a single overlapping line pattern, and the processor determines the distance to the target object based on the appearance of the line pattern on the target object. Alternatively, the two simultaneously emitting LPGs may generate line patterns that can be distinguished by the processor, e.g., line patterns comprising light of different wavelengths, or line patterns comprising light of different polarizations. The depth sensor may include one or more filters to generate two distinct images which are processed to identify phase shifts, as described above.

As will be appreciated by one skilled in the art, aspects of the present disclosure, in particular aspects of depth sensing using multiple LPGs, described herein, may be embodied in various manners—e.g. as a method, a system, a computer program product, or a computer readable storage medium. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing measurement systems or their controllers) or be stored upon manufacturing of these devices and systems.

In the following detailed description, various aspects of the illustrative implementations may be described using terms commonly employed by those skilled in the art to convey the substance of their work to others skilled in the art. For example, the term "connected" means a direct electrical or magnetic connection between the things that are connected, without any intermediary devices, while the term "coupled" means either a direct electrical or magnetic connection between the things that are connected, or an indirect connection through one or more passive or active intermediary devices. The term "circuit" means one or more passive and/or active components that are arranged to cooperate with one another to provide a desired function. The terms "substantially," "close," "approximately," "near," and "about," generally refer to being within +/−20%, preferably within +/−10%, of a target value based on the context of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the context of a particular value as described herein or as known in the art.

The terms such as "over," "under," "between," and "on" as used herein refer to a relative position of one material layer or component with respect to other layers or components. For example, one layer disposed over or under another layer may be directly in contact with the other layer or may have one or more intervening layers. Moreover, one layer disposed between two layers may be directly in contact with one or both of the two layers or may have one or more intervening layers. In contrast, a first layer described to be "on" a second layer refers to a layer that is in direct contact with that second layer. Similarly, unless explicitly stated otherwise, one feature disposed between two features may be in direct contact with the adjacent features or may have one or more intervening layers.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges. As used herein, the notation "A/B/C" means (A), (B), and/or (C).

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. The disclosure may use perspective-based descriptions such as "above," "below," "top," "bottom," and "side"; such descriptions are used to facilitate the discussion and are not intended to restrict the application of disclosed embodiments. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

In the following detailed description, reference is made to the accompanying drawings that form a part hereof, showing, by way of illustration, some of the embodiments that may be practiced. In the drawings, same reference numerals refer to the same or analogous elements/materials so that, unless stated otherwise, explanations of an element/material with a given reference numeral provided in context of one of the drawings are applicable to other drawings where elements/materials with the same reference numerals may be illustrated. For convenience, if a collection of drawings designated with different letters are present, e.g., FIGS. 2A-2C, such a collection may be referred to herein without the letters, e.g., as "FIG. 2." The accompanying drawings are not necessarily drawn to scale. Moreover, it will be understood that certain embodiments can include more elements than illustrated in a drawing, certain embodiments can include a subset of the elements illustrated in a drawing, and certain embodiments can incorporate any suitable combination of features from two or more drawings.

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

In some examples provided herein, interaction may be described in terms of two, three, four, or more electrical components. However, this has been done for purposes of clarity and example only. It should be appreciated that the devices and systems described herein can be consolidated in any suitable manner. Along similar design alternatives, any of the illustrated components, modules, and elements of the accompanying drawings may be combined in various possible configurations, all of which are clearly within the broad scope of the present disclosure. In certain cases, it may be easier to describe one or more of the functionalities of a given set of flows by only referencing a limited number of electrical elements.

The following detailed description presents various descriptions of specific certain embodiments. However, is to be understood that other embodiments may be utilized, and structural or logical changes may be made without departing from the scope of the present disclosure. In general, the innovations described herein can be embodied in a multitude of different ways, for example, as defined and covered by the claims and/or select examples, and the following detailed description is not to be taken in a limiting sense.

Example Depth Sensor with a Single LPG

Figure 1:
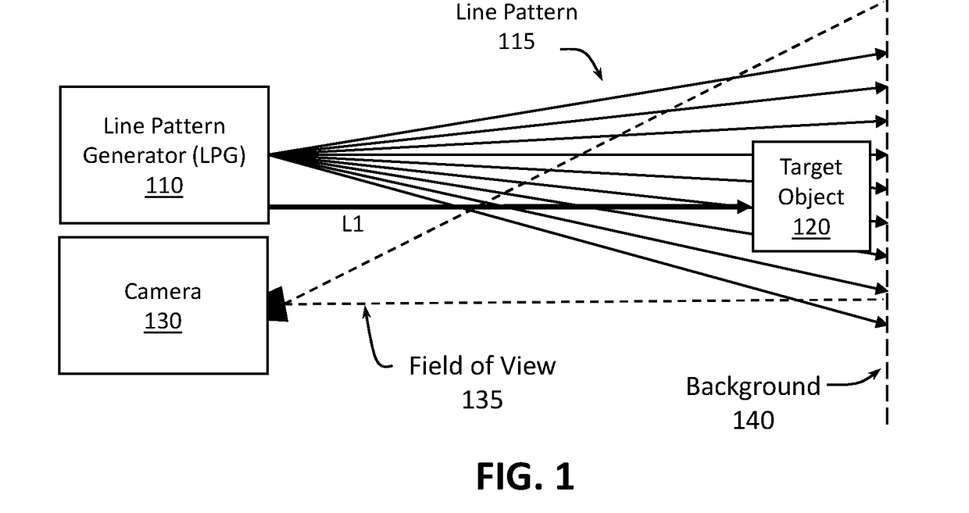
FIG. 1 provides an example top view of a line pattern generator generating a line pattern on a target object at a first distance and a camera capturing an image of the target object.

FIG. 1 provides an example top view of a line pattern generator (LPG) generating a line pattern on a target object at a first distance and a camera capturing an image of the target object. The target object 120 may be any object for which a distance measurement is taken. In this example, the target object 120 is a box, e.g., a box sitting on a table that may be moved around a room; in other examples, the target object 120 may be other items (e.g., inanimate objects, people, animals, walls, etc.) depending on the use case. The LPG 110 generates a line pattern 115, which is directed at the target object 120. The LPG 110 produces a line pattern 115 having alternating bright portions and dark portions. The rays of the line pattern 115 shown in FIG. 1 represent maxima of the bright portions of the line pattern created by the LPG 110. The LPG 110 includes a light source, such as a laser, an LED, or an array of LEDs. The LPG 110 further includes an apparatus for patterning the light emitted by the light source, such as a grating or an interferometer. For example, the LPG 110 may include one or more gratings that selectively block light generated by the light source, such as a series of slits. As another example, the LPG 110 may include a Michelson interferometer, double-slit interferometer, or other type of interferometer that generates a series of interference fringes. In one example, the light source (e.g., a laser) generates highly collimated light that is passed through the patterning apparatus. In another example, the light source (e.g., an LED) generates light that is not highly collimated, and multiple gratings are used to both collimate the light and form the line pattern 115. In some embodiments, the LPG 110 includes one or more lenses, such as one or more focusing lenses for collimating the light, or disbursing lenses for distributing the light pattern across a wider area.

The camera 130 is configured to capture one or more images of a field of view 135 of the camera 130. The camera 130 is positioned to capture a field of view 135 that includes some or all of the line pattern 115 when the line pattern 115 is illuminating one or more target objects within a given region relative to the LPG 110 and camera 130. In the example shown in FIG. 1, the camera 130 is positioned to capture images of the target object 120 and a background 140 behind the target object 120. The background 140 may be a wall or other surface or item behind the target object 120. In some embodiments, the background 140 is a second, reference object at a known location or known distance from the camera 130 and LPG 110. The target object 120 and the background 140 are both illuminated by the line pattern 115. The camera 130 captures the wavelength(s) of light emitted by the LPG 110. For example, if the line pattern 115 is near infrared light, the camera 130 captures light in the near infrared range.

Figure 3:
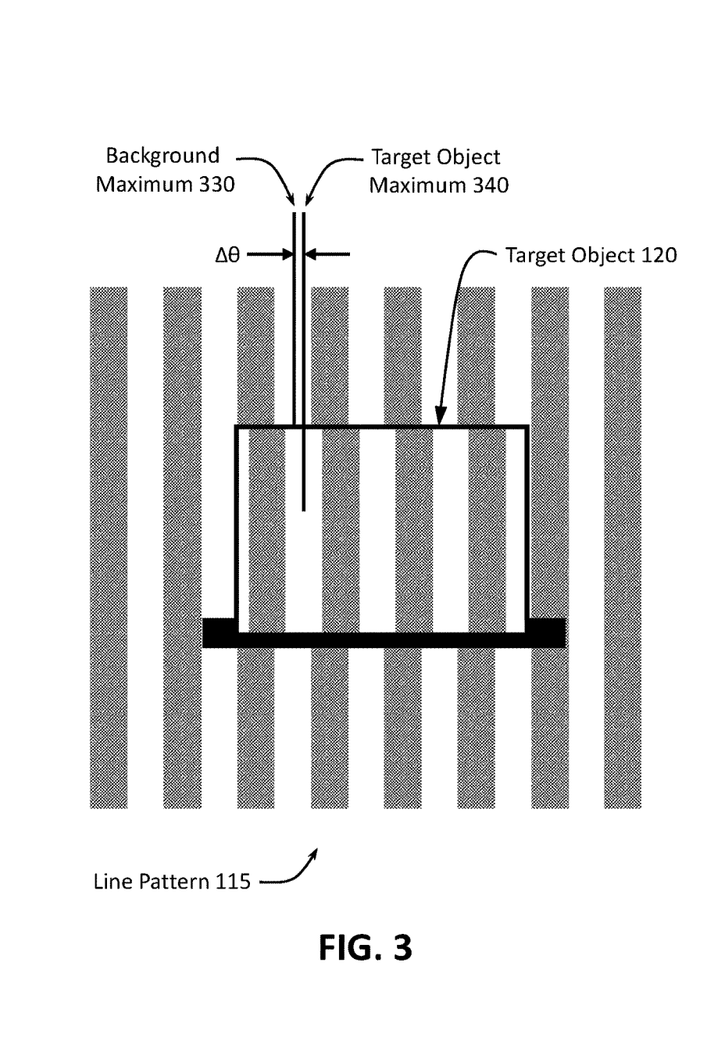
FIG. 3 provides an example front view of the target object at the first distance.

The LPG 110 and camera 130 may be part of a distance measurement system that also includes a processor (not shown in FIG. 1). The camera 130 provides captured images to the processor, which analyzes the captured images to determine a distance to target objects. In the example shown in FIG. 1, the processor may determine a distance L1 of the target object 120 based on at least one image of the line pattern 115 projected on the target object 120 and the background 140. The appearance of the line pattern 115 on the target object 120 varies based on the distance between the LPG 110 and the target object 120. FIG. 3 shows an example front view of the target object 120 and background 140 illuminated by the line pattern 115.

Figure 2:
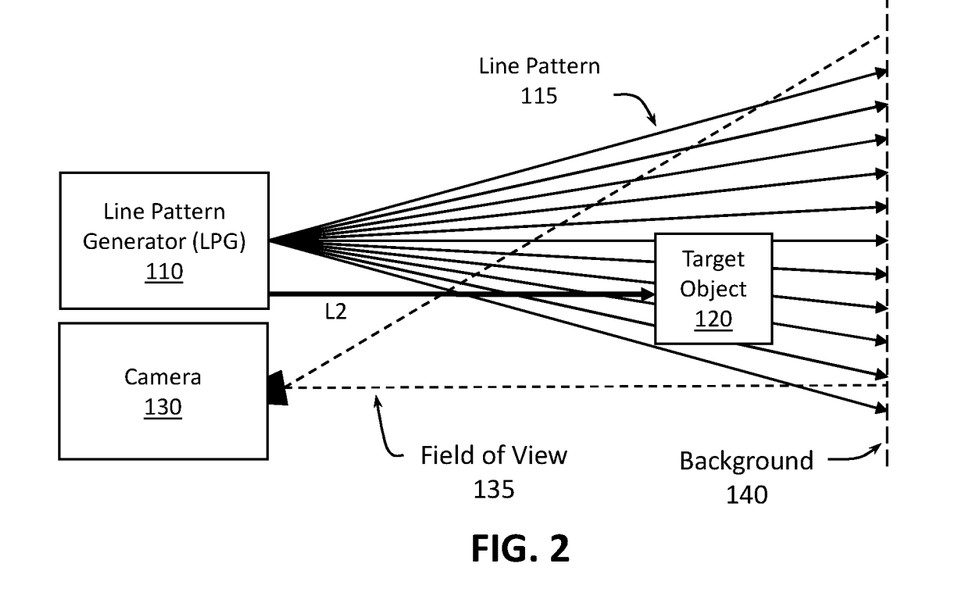
FIG. 2 provides an example top view of the line pattern generator generating a line pattern on the target object at a second distance and the camera capturing an image of the target object.

FIG. 2 provides an example top view of the line pattern generator generating a line pattern on the target object at a second distance and the camera capturing an image of the target object. In this example, the target object 120 is a distance L2 from the LPG 110, where L2 is less than L1. In other words, the target object 120 has moved closer to the LPG 110 from its previous position in FIG. 1. The line pattern 115 projected by the LPG 110 is illuminating the target object 120 and the background 140, and the camera 130 captures one or more images of the field of view 135, which includes the target object 120 and the background 140.

FIG. 3 provides an example front view of the target object 120 at the first distance L1. The view shown in FIG. 3 may be captured by the camera 130 in the arrangement shown in FIG. 1. In this example, the target object 120 is depicted as a box resting on a table. The line pattern 115 is illustrated as a series of stripes (i.e., alternating bright portions and dark portions) that illuminate both the target object 120 and the background 140. The shaded portions of the line pattern 115 represent the dark portions, and the unshaded portions of the line pattern 115 represent the bright portions. The line pattern 115 has a periodicity, with the bright portions and dark portions positioned at regular intervals relative to each other. While the bright portions and dark portions as shown as having a consistent brightness across their width, the brightness within a bright portion and within a dark portion may vary across the width of the bright portion or dark portion, e.g., with a maximum brightness along a center of a bright portion, and a minimum brightness along a center of a dark portion. The period of the line pattern 115 can be described by an angular distance between two points (e.g., two maxima) of adjacent bright portions, or between two points (e.g., two minima) of adjacent dark portions as emitted from the LPG 110.

The portion of the line pattern 115 illuminating the target object 120 is phase shifted relative to the portion of the line pattern 115 illuminating the background 140, i.e., the portion of the line pattern 115 illuminating the target object 120 does not line up in phase with the portion of the line pattern 115 illuminating the background 140. For example, the background maximum 330 drawn in FIG. 3 is a maximum of one of the bright portions of the line pattern 115 on the background 140, located at the midpoint of the bright portion. The target object maximum 340 drawn in FIG. 3 is a maximum of one of the bright portions of the line pattern 115 on the target object 120, located at the midpoint of the bright portion. The background maximum 330 and target object maximum 340 are separated by a phase difference labeled $\Delta\theta$. In this example, and as shown in FIG. 1, the target object 120 is close to the background 140, and the phase shift between the target object 120 and background 140 is minimal. A distance measurement system may correctly calculate the distance to the target object L1 based on the phase difference $\Delta\theta$.

Figure 4:
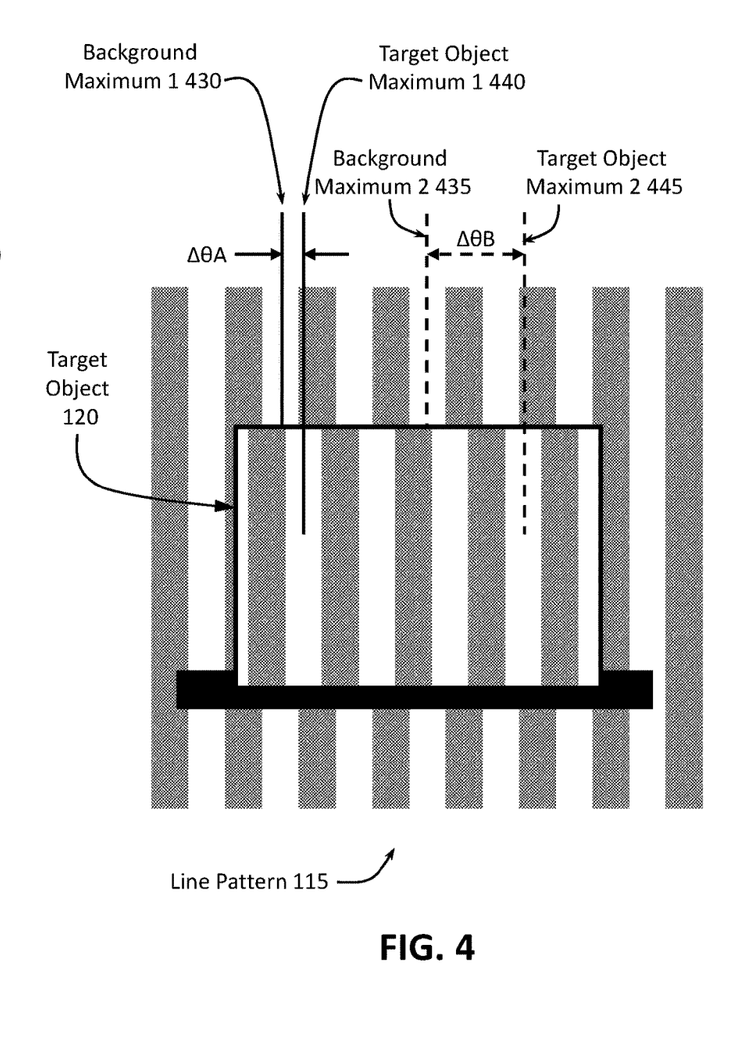
FIG. 4 provides an example front view of the target object at the second distance.

FIG. 4 provides an example front view of the target object at the second distance L2. The view shown in FIG. 2 may be captured by the camera 130 in the arrangement shown in FIG. 2. In this example, the target object 120 is farther from the background 140 and closer to the camera 130 and LPG 110. Two background maxima 430 and 435 showing two example maxima of the bright portions of the line pattern 115 on the background 140 are drawn in FIG. 4. Two target object maxima 440 and 445 showing two example maxima of the bright portions of the line pattern 115 along the target object 120 are also drawn in FIG. 4. The distance between background maximum 1 430 and target object maximum 1 440 represents one possible phase difference $\Delta\theta A$ between the portion of the line pattern 115 illuminating the target object 120 and the portion of the line pattern 115 illuminating the background 140. The distance between background maximum 2 435 and target object maximum 2 445 represents a second possible phase difference $\Delta\theta A$ between the portion of the line pattern 115 illuminating the target object 120 and the portion of the line pattern 115 illuminating the background 140. A processor receiving the image shown in FIG. 4 may not be able to determine the correct phase difference, e.g., $\Delta\theta A$ or $\Delta\theta B$, and thus, may not be able to accurately determine the distance L2. For example, if the processor assumes that the line pattern is not shifted by more than one period (i.e., the processor assumes that $\Delta\theta A$ represents the phase difference between the target object 120 and the background 140), but $\Delta\theta B$ represents the actual phase difference between the line pattern portions on the target object 120 and the background 140, the processor calculates an incorrect distance L2.

Example Line Patterns Generated by Two LPGs

Figure 5:
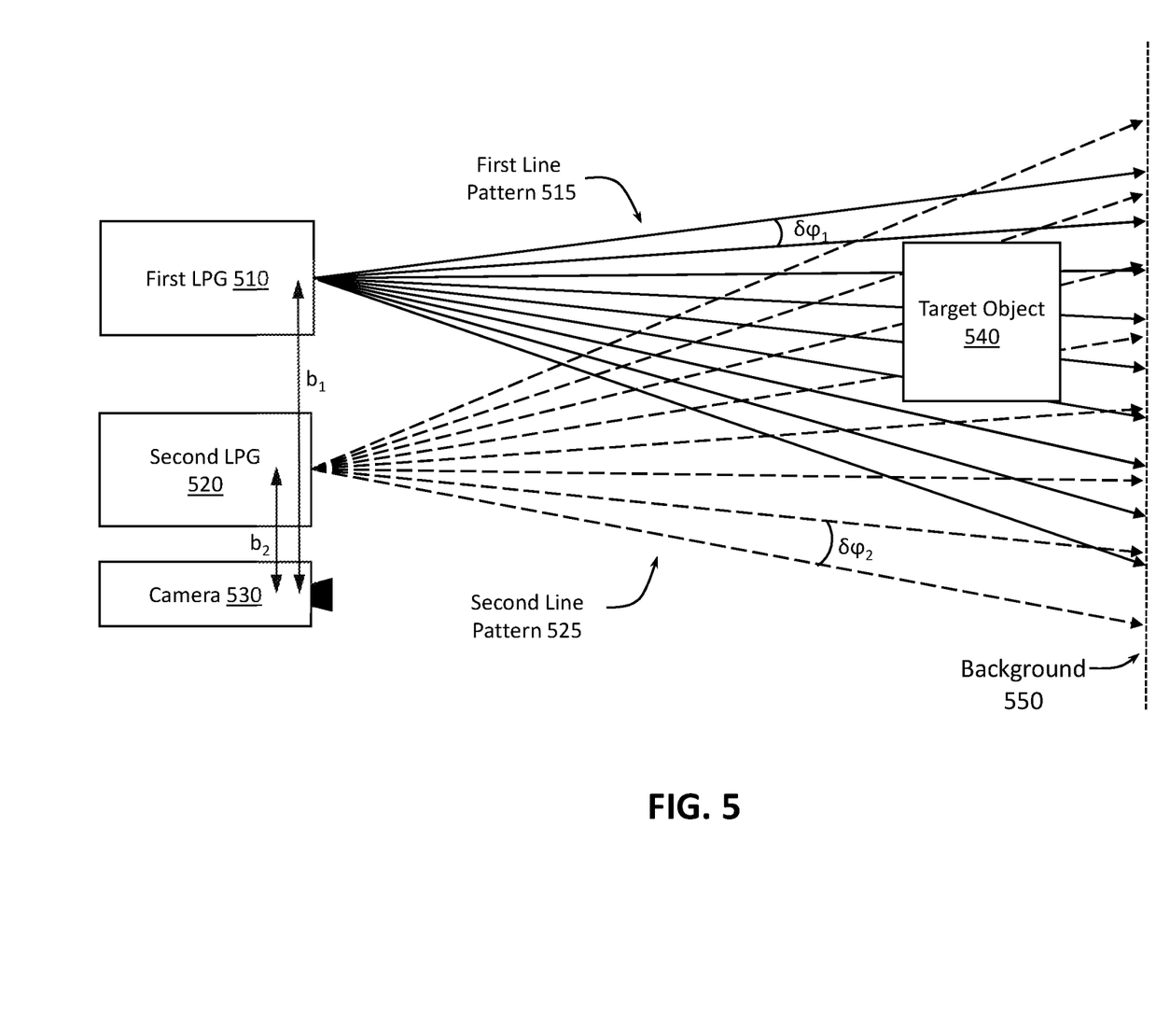
FIG. 5 provides an example top view of a pair of line pattern generators generating line patterns on a target object, according to some embodiments of the present disclosure.

FIG. 5 provides an example top view of a pair of line pattern generators generating line patterns on a target object, according to some embodiments of the present disclosure. A first LPG 510 emits a first line pattern 515. A second LPG 520 emits a second line pattern 525. The first LPG 510 and the second LPG 520 are referred to collectively as LPGs 510 and 520, and the first line pattern 515 and the second line pattern 525 are referred to collectively as line patterns 515 and 525. The first LPG 510 and second LPG 520 are each similar to the LPG 110 described with respect to FIG. 1. Each of the line patterns 515 and 525 has alternating bright portions and dark portions, where adjacent dark portions are separated by a bright portion and vice versa. The first line pattern 515 is represented using solid rays and the second line pattern 525 is represented using dashed rays to distinguish the representation of the second line pattern 525 from the representation of the first line pattern 515. The rays of light shown in FIG. 5 may represent maxima of the bright portions of the line patterns 515 and 525 created by the LPGs 510 and 520, respectively.

The first line pattern 515 has a first angular distance $\delta\varphi_1$ between corresponding portions of the line pattern 515 separated by one period, e.g., between two adjacent maxima of the line pattern 515. The second line pattern 525 has a second angular distance $\delta\varphi_2$ between corresponding portions of the line pattern 525 separated by one period, e.g., between two adjacent maxima of the line pattern 525. In some embodiments, the angular distance $\delta\varphi_1$ of the first line pattern 515 is different from the angular distance $\delta\varphi_2$ of the second line pattern 525; in the example shown in FIG. 5, $\delta\varphi_1 < \delta\varphi_2$. Different gratings or interferometers may be used to generate line patterns with different angular distances. For example, if a double slit interferometer is used to generate the line patterns 515 and 525, the distance between the slits can be different between the two LPGs 510 and 520 to create different angular spacing of their respective fringes because angular spacing is inversely proportional to the distance between the two slits. Thus, the first LPG 510 may have a double slit grating with slits positioned farther apart than a double slit grating in the second LPG 520. In other embodiments, the angular distance $\delta\varphi_1$ of the first line pattern 515 is the same as the angular distance $\delta\varphi_2$ of the second line pattern 525.

A camera 530 is positioned below the two LPGs 510 and 520. The camera 530 is similar to the camera 130 described with respect to FIG. 1. The camera 530 is configured to capture at least one image of the first line pattern 515 and the second line pattern 525. The camera 530 has a field of view that includes a target object 540 and a background 550 behind the target object 540. The field of view is not shown in FIG. 5, but may be similar to the field of view 135 shown in FIGS. 1 and 2.

The first LPG 510 is a first distance $b_1$ from the camera 530, and the second LPG 520 is a second distance $b_2$ from the camera 530. More specifically, the point at which the first line pattern 515 exits the first LPG 510 is the first distance $b_1$ from an aperture of the camera 530, and the point at which the second line pattern 525 exits the second LPG 520 is the second distance $b_2$ from the aperture of the camera 530. When two different LPG assemblies are used for the first LPG 510 and the second LPG 520, such as the example shown in FIG. 5, $b_1$ is different from $b_2$. In other embodiments, the first LPG 510 and the second LPG 520 may use a single light source but have different, swappable interferometers (e.g., two different grating assemblies) for generating the two different line patterns 515 and 525. In such embodiments, the line patterns 515 and 525 are projected from the same location, so $b_1$ and $b_2$ are equal, but the two line patterns have different angular distances $\delta\varphi_1$ and $\delta\varphi_2$.

A processor (not shown in FIG. 5) may control the LPGs 510 and 520 and the camera 530. For example, the processor instructs the first LPG 510 and the second LPG 520 to turn on and emit the line patterns 515 and 525, and instructs the camera 530 to capture one or more images of the line patterns 515 and 525. In one embodiment, the processor instructs the LPGs 510 and 520 to emit light simultaneously, and instructs the camera 530 to capture an image of the two line patterns 515 and 525 simultaneously illuminating the target object 540. In another embodiment, the processor instructs the LPGs 510 and 520 to emit light in series (e.g., first the first LPG 510, and then the second LPG 520), and instructs the camera 530 to capture images of each of the line patterns 515 and 525 separately illuminating the target object 540.

Figure 6:
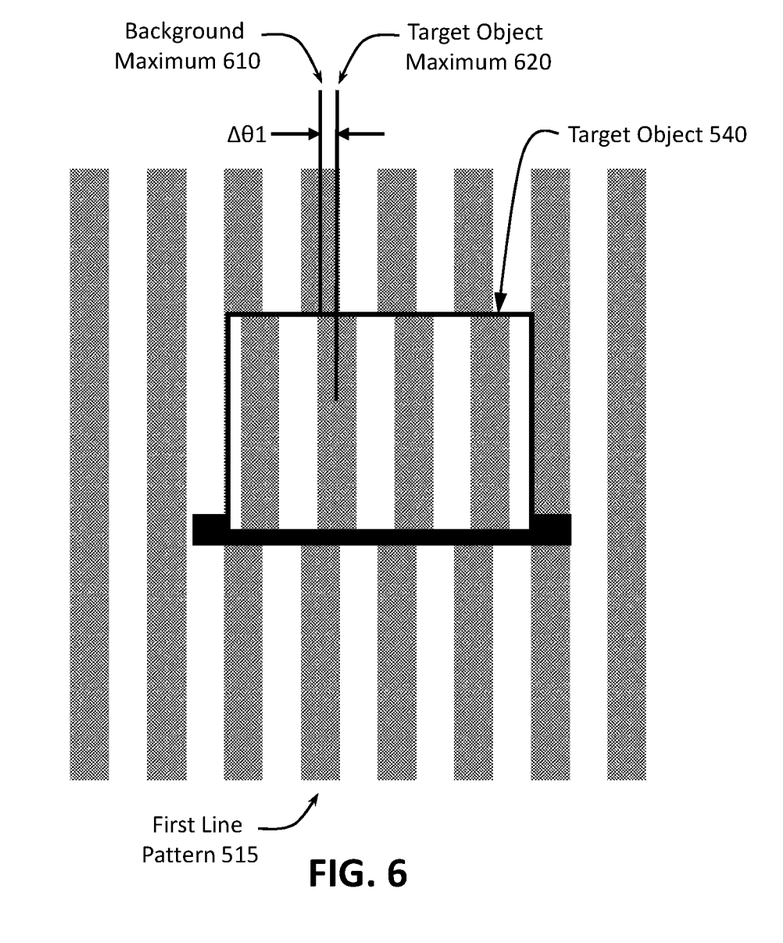
FIG. 6 provides an example front view of the target object and background illuminated by a first line pattern generator of the pair of line pattern generators in FIG. 5, according to some embodiments of the present disclosure.

FIG. 6 provides an example front view of the target object 540 and background 550 illuminated by a first line pattern generator (e.g., the first LPG 510) of the pair of line pattern generators in FIG. 5, according to some embodiments of the present disclosure. The view shown in FIG. 6 may be captured by the camera 530 in the arrangement shown in FIG. 5. In this example, the target object 540 is depicted as a box resting on a table. The first line pattern 515 is illustrated as a series of stripes (i.e., alternating bright portions and dark portions) that illuminate both the target object 540 and the background 550. The shaded portions of the line pattern 515 represent the dark portions, and the unshaded portions of the line pattern 515 represent the bright portions. The line pattern 515 has a periodicity, with the bright portions and dark portions positioned at regular intervals relative to each other. While the bright portions and dark portions as shown as having a consistent brightness across their width, the brightness within a bright portion and within a dark portion may vary across the width of the bright portion or dark portion, e.g., with a maximum brightness along a center of a bright portion, and a minimum brightness along a center of a dark portion. The period of the line pattern 515 is described by the angular distance $\delta\varphi_1$ described with respect to FIG. 5.

The portion of the first line pattern 515 illuminating the target object 540 is phase shifted relative to the portion of the first line pattern 515 illuminating the background 550. The portion of the first line pattern 515 illuminating the target object 540 does not line up with the portion of the line pattern 515 illuminating the background 550. For example, the background maximum 610 drawn in FIG. 6 is a maximum of one of the bright portions of the first line pattern 515 on the background 550, located at the midpoint of the bright portion. The target object maximum 620 drawn in FIG. 6 is a maximum of one of the bright portions of the first line pattern 515 on the target object 540, located at the midpoint of the bright portion. The background maximum 610 and target object maximum 620 are separated by a phase difference labeled $\Delta\theta1$. As described with respect to FIG. 4, the actual phase difference may be greater than the labeled phase difference $\Delta\theta1$ because the phase may be shifted by more than one period. Using the second LPG 520 to generate a second line pattern 525 generates additional visual data that can be used to correctly determine the distance of the target object 540 in a situation where a single LPG may be ambiguous.

Figure 7:
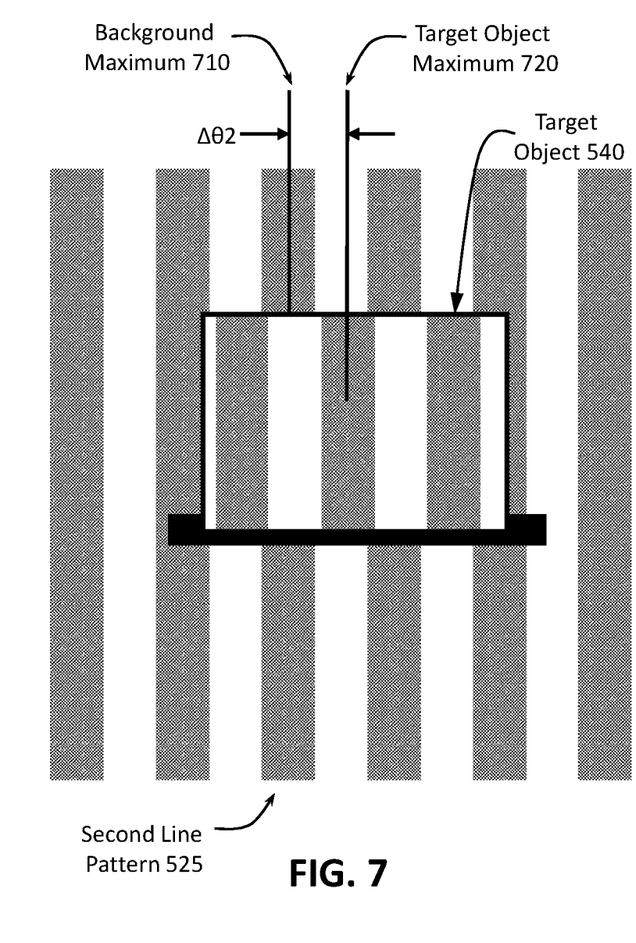
FIG. 7 provides an example front view of the target object and background illuminated by a second line pattern generator of the pair of line pattern generators in FIG. 5, according to some embodiments of the present disclosure.

FIG. 7 provides an example front view of the target object 540 and background 550 illuminated by a second line pattern generator (e.g., the second LPG 520) of the pair of line pattern generators in FIG. 5, according to some embodiments of the present disclosure. The view shown in FIG. 7 may be captured by the camera 530 in the arrangement shown in FIG. 5. In this example, the second line pattern 525 is represented as a series of stripes (i.e., alternating bright portions and dark portions) that illuminate both the target object 540 and the background 550, similar to the representation of the first line pattern 515 in FIG. 6. The second line pattern 525 has a longer period than the first line pattern 515, corresponding to the greater angular distance $\delta\varphi_2$ (relative to the smaller angular distance $\delta\varphi_1$ of the first line pattern 515) shown in FIG. 5.

The portion of the second line pattern 525 illuminating the target object 540 is phase shifted relative to the portion of the second line pattern 525 illuminating the background 550. A background maximum 710, similar to the background maximum 610, is a maximum of one of the bright portions of the second line pattern 525 on the background 550. A target object maximum 720, similar to the target object maximum 620, is a maximum of one of the bright portions of the second line pattern 525 on the target object 540. The background maximum 710 and the target object maximum 720 are separated by a phase difference labeled $\Delta\theta2$. The actual phase difference may be greater than the labeled phase difference $\Delta\theta2$ because the phase may be shifted by more than one period. However, using both phase differences $\Delta\theta1$ and $\Delta\theta2$ enables a distance measurement system to accurately determine the distance of the target object 540 in a situation where a phase difference in a single line pattern (e.g., either the first line pattern 515 or the second line pattern 525) is ambiguous.

While the two line patterns 515 and 525 generated by the LPGs 510 and 520 are depicted as vertical line patterns, it should be understood that alternate line patterns may be used. The LPGs 510 and 520 may generate any line patterns that exhibit periodicity, so that a phase shift can be determined. For example, the line patterns may be series of or horizontal lines or diagonal lines. As another example, the line patterns may be series of dots, e.g., a line of equally spaced dots, or a grid of dots having periodicity in two directions. As another example, the line patterns may be concentric circles, and the angular distance refers to a distance between two adjacent circles.

Example Distance Measuring System Using Two LPGs

Figure 8:
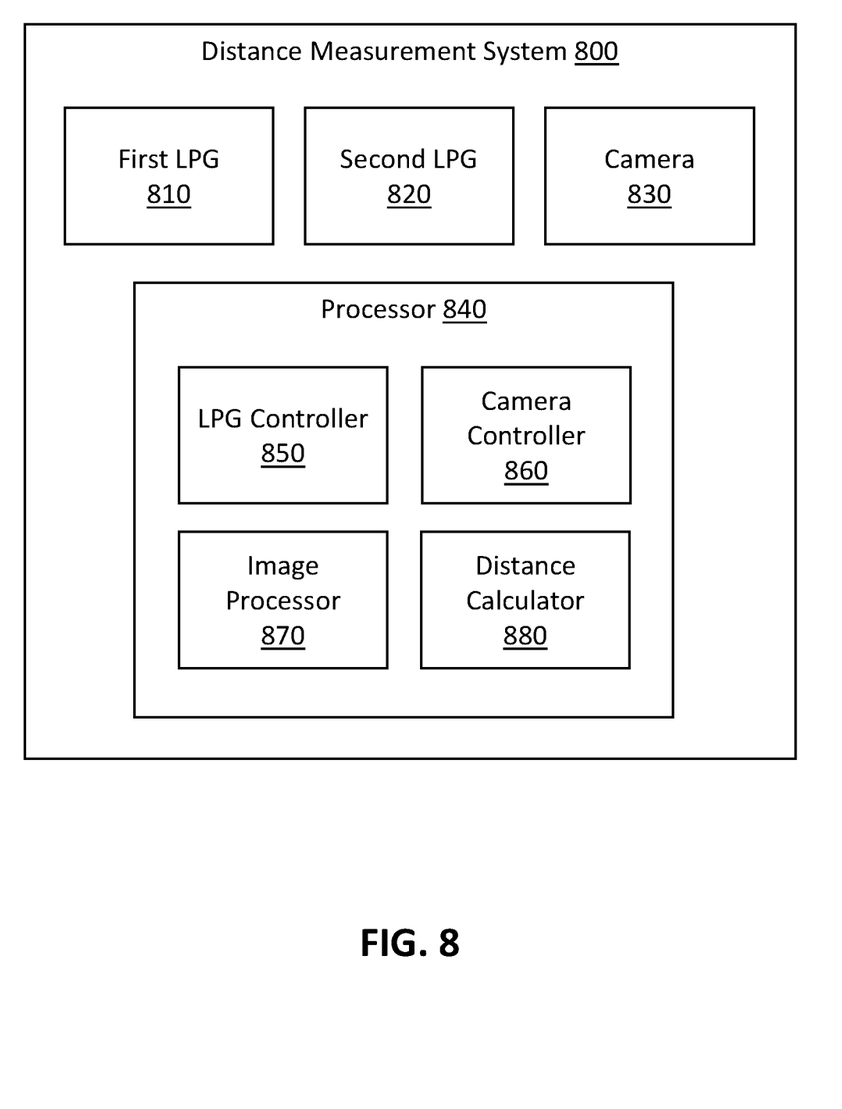
FIG. 8 provides a block diagram illustrating an example of a distance measuring system for measuring a distance to a target object, according to some embodiments of the present disclosure.

FIG. 8 provides a block diagram illustrating an example of a distance measuring system 800 for measuring a distance to a target object, according to some embodiments of the present disclosure. The distance measurement system 800 includes a first LPG 810, a second LPG 820, a camera 830, and a processor 840. The first LPG 810, second LPG 820, and camera 830 are similar to the first LPG 510, second LPG 520, and camera 530 described with respect to FIGS. 5-7. In particular, the first LPG 810 produces a first line pattern, and the second LPG 820 produces a second line pattern. The first LPG 810 and second LPG 820 differ in their relative distances, $b_1$ and $b_2$, to the camera 830; their respective angular distances, $\delta\varphi_1$ and $\delta\varphi_2$, between adjacent bright portions of their respective line patterns; or in both their relative distances to the camera $b_1$ and $b_2$ and angular distances $\delta\varphi_1$ and $\delta\varphi_2$. The camera 830 is configured to capture one or more images, and is positioned to capture a field of view that includes some or all of the line patterns generated by the first LPG 810 and the second LPG 820. In some embodiments, one or more additional LPGs are included to produce additional line patterns. In some embodiments, multiple cameras 830 are included, e.g., to take images of a target object from different angles.

The processor 840 includes an LPG controller 850, a camera controller 860, an image processor 870, and a distance calculator 880. The elements of the processor 840 shown in FIG. 8 are exemplary, and other arrangements or configurations may be used. For example, one or more of the components of the processor 840 are implemented by different processors, or on a different device. As another example, one or more components 850-880 are performed by a single element, e.g., a single image processing and distance calculating module may be used rather than a separate image processor 870 and distance calculator 880.

The LPG controller 850 interfaces with the first LPG 810 and the second LPG 820. The LPG controller 850 may instruct each of the first LPG 810 and second LPG 820 to emit their respective line patterns. For example, the LPG controller 850 may instruct the first LPG 810 to emit the first line pattern during a first period of time, and instruct the second LPG 820 to emit the second line pattern during a second period of time. The LPG controller 850 may instruct the two LPGs 810 and 820 to turn on and off in a sequence, e.g., the first LPG 810 turns on and off, then the second LPG 820 turns on and off, then the first LPG 810 turns on and off, etc. As another example, the LPG controller 850 instructs both the first LPG 810 and the second LPG 820 to turn on simultaneously to generate an overlapping line pattern. Examples of overlapping line patterns are described with respect to FIGS. 9 and 10. Other overlapping line patterns may be formed by light of two different wavelengths, polarizations, or other features that enable the image processor 870 to distinguish the two line patterns.

The LPG controller 850 may alternately instruct the LPGs to generate single-LPG line patterns and overlapping line patterns, e.g., first instructing the first LPG 810 to turn on, then instructing a second LPG 820 to turn on, then instructing both LPGs 810 and 820 to turn on simultaneously. If additional LPGs are included, the LPG controller 850 may add the additional LPG(s) to a sequence and/or to an overlapping line pattern. In another example, the LPG controller 850 selectively turns on and off different subsets of LPGs, e.g., first turning on a first LPG and second LPG simultaneously to generate a first overlapping line pattern, then turning on the first LPG and a third LPG simultaneously to generate a different overlapping line pattern, etc. In the embodiment where the first LPG 810 and second LPG 820 are in an LPG apparatus that includes a single light source with multiple, swappable gratings, the LPG controller 850 instructs the LPG apparatus to position a grating over the light source to create the first LPG 810 or the second LPG 820. In some embodiments, the one or both of the LPGs 810 and 820 are separate devices from the distance measurement system 800, and the processor 840 may or may not control the LPGs 810 and 820.

The camera controller 860 interfaces with the camera 830. The camera controller 860 instructs the camera 830 to capture images of the light patterns generated by the first LPG 810 and the second LPG 820. The camera controller 860 may be synchronized with the LPG controller 850 so that the camera 830 captures images while a particular LPG or set of LPGs are emitting a line pattern or line patterns. For example, the camera controller 860 instructs the camera 830 to capture a first image of a target object while the target object is illuminated by the first LPG 810, and instructs the camera 830 to capture a second image of the target object while the target object is illuminated by the second LPG 820. The camera controller 860 receives the images captured by the camera 830. In some embodiments, the camera controller 860 or image processor 870 comprises one or more filters for filtering captured light. For example, if the two LPGs 510 and 520 produce the line patterns 515 and 525 simultaneously, and the respective line patterns 515 and 525 are composed of light of different wavelengths or polarizations, filters may be used used to generate two distinct images, one with the first line pattern 515 and one with the second line pattern 525. In some embodiments, the camera 830 is a separate device from the distance measurement system 800, and the processor 840 may or may not control the camera 830. In such embodiments, images captured by the camera are received by the image processor 870.

The image processor 870 processes the images captured by the camera, such as the images shown in FIGS. 6 and 7. For a received image, the image processor 870 identifies the target object in the image. For example, the image processor 870 uses one or more known object detection algorithms to search for a target object, such as an edge detection algorithm, object classification or other machine learning approaches, pattern recognition, feature detection, etc. The image processor 870 may also identify a background region in the image. For example, image processor 870 may determine that a region outside the identified target object is the background. In some embodiments, the image processor 870 may identify a particular region or fixed object to use as a background region. For example, a piece of furniture at a known location that does not move may serve as a background region, even if the target object is next to the furniture, rather than in front of it.

In some embodiments, after detecting the target object and the background, the image processor 870 determines a phase difference between the line pattern on the target object and the line pattern on the background. For example, the image processor 870 may identify a line of maximum brightness in the target object and a line of maximum brightness in the background. If the line patterns are striped lines, the lines of maximum brightness are parallel, as shown in FIGS. 6 and 7. The image processor 870 then calculates the phase difference between the lines of maximum brightness. FIGS. 6 and 7 show two example representations of the phase difference calculation. In some embodiments, the image processor 870 uses lines of minimum brightness or other corresponding points or lines in the line pattern between the target object and the background. If the camera 830 captures different images for different line patterns, e.g., a first image including the line pattern 515 and a second image including the line pattern 525, the image processor 870 determines a phase difference for each image, e.g., the first phase difference $\Delta\theta1$ between the first line pattern 515 on the target object 540 and on the background 550, and the second phase difference Δθ2 between the second line pattern 525 on the target object 540 and on the background 550.

Figure 9:
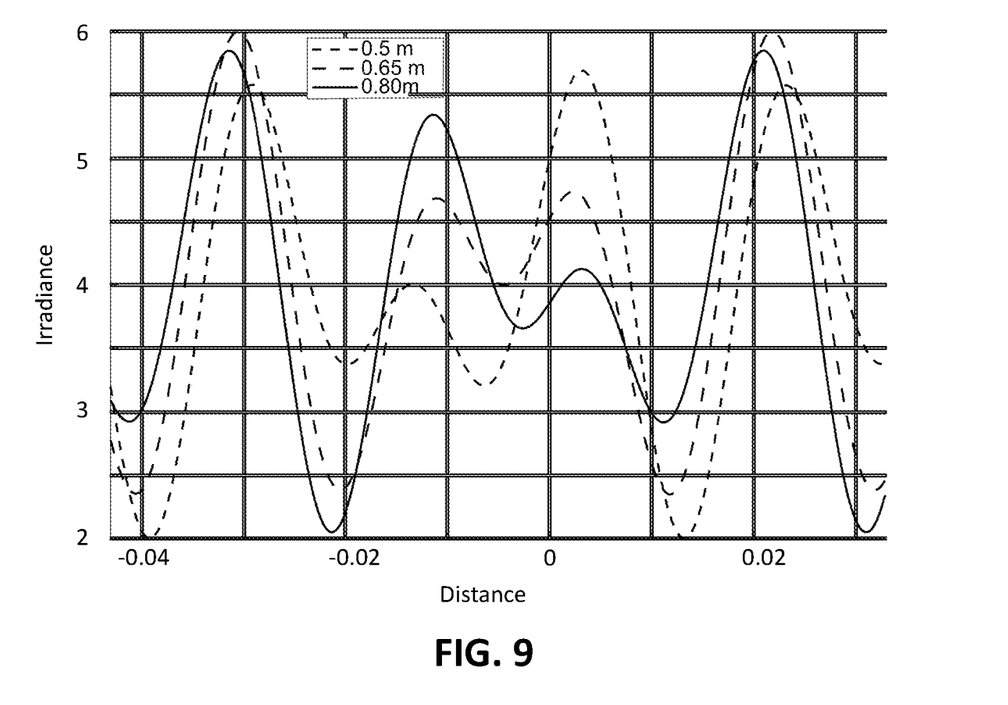
FIG. 9 shows three example line patterns at three distances formed by the overlap of two line pattern generators, according to an embodiment of the present disclosure.
Figure 10:
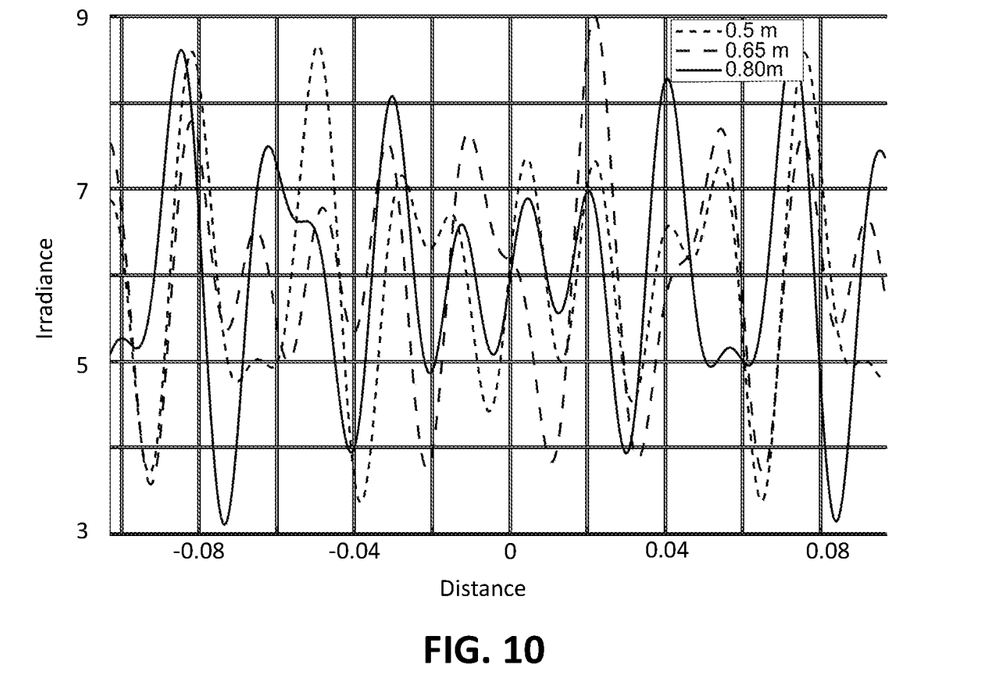
FIG. 10 shows three example line patterns at three distances formed by the overlap of three line pattern generators, according to an embodiment of the present disclosure.

In other embodiments, the image processor 870 extracts an intensity pattern of the line pattern on the target object based on the image. If multiple LPGs generate an overlapping line pattern, the intensity pattern (e.g., the locations of bright portions and dark portions across the target object) varies based on the distance between the LPGs and the target object, as shown in FIGS. 9 and 10. The image processor 870 generates a representation of the intensity pattern across the target object or a portion of the target object, e.g., the image processor 870 identifies points (e.g., pixels) within the target object and extracts intensities associated with each points. In such embodiments, the image processor 870 may not extract data describing the background, and a distance to the background may not be known.

The distance calculator 880 determines a distance to the target object based on an appearance of the target object as illuminated by the first line pattern and the second line pattern in the captured image or images. In embodiments in which the image processor 870 determines phase differences in multiple images, e.g., the image processor 870 determines the first phase difference Δθ1 and the second phase difference Δθ2, the distance calculator 880 calculates the distance to the target object based on the two phase differences. For example, if the image processor 870 receives two images and calculates two phase differences Δθ1 and Δθ2 based two line patterns from two LPGs, the distance calculator 880 calculates the distance to the target object according to the following equation:

$$\Delta\alpha = \Delta\theta 1 - \Delta\theta 2 = \left(\frac{2\pi b_1}{\delta\varphi_1} - \frac{2\pi b_2}{\delta\varphi_2}\right)(L^{-1} - L_0^{-1})$$

where Δα is the difference between the first phase difference Δθ1 and the second phase difference Δθ2, $b_1$ is the distance from the camera 830 to the first LPG 810, $b_2$ is the distance from the camera 830 to the second LPG 820, $\delta\varphi_1$ is the angular distance of the first line pattern generated by the first LPG 810, $\delta\varphi_2$ is the angular distance of the second line pattern generated by the second LPG 820, and $L_0$ is a distance to the background. The value of Δα is between 0 and 2π. The distance calculator 880 solves the above equation for L, the distance to the target object.

In embodiments in which the image processor 870 extracts an intensity pattern of the line pattern on the target object based on an image of an overlapping line pattern, the distance calculator 880 determines the distance to the target object by comparing the extracted intensity patterns to a model of the overlapping line pattern. The model of the overlapping line pattern may include a set of stored intensity patterns corresponding to various distances, and the distance calculator 880 identifies the stored intensity pattern most similar to the extracted intensity pattern. Examples of expected intensity patterns at different distances are shown in FIGS. 9 and 10. As another example, the distance calculator 880 inputs the extracted intensity pattern to a model that calculates or estimates the distance based on the extracted intensity pattern.

Example Line Patterns Generated by Overlapping LPGs

FIG. 9 shows three example line patterns at three distances formed by the overlap of two LPGs, according to an embodiment of the present disclosure. In this example, the two LPGs are positioned 1 centimeter apart from one another. The angular distance $\delta\varphi_1$ of the first LPG is 1°, and the angular distance $\delta\varphi_2$ of the second LPG is 1.5°. The graph in FIG. 9 shows the intensity patterns at three different distances from the two LPGs: 0.50 meters, 0.65 meters, and 0.80 meters. As shown in FIG. 9, the line pattern generated by the overlap of the two LPGs is different at different distances, and an observation of a target object at one distance can be distinguished from an observation of the target object at another distance based on the observed intensity pattern across the target object.

FIG. 10 shows three example line patterns at three distances formed by the overlap of three LPGs, according to an embodiment of the present disclosure. In this example, a first LPG is positioned 1 centimeter from a second LPG, and a third LPG is positioned 1.5 centimeters from the second LPG, on the other side relative to the first LPG (e.g., 2.5 centimeters from the first LPG). The angular distance $\delta\varphi_1$ of the first LPG is 1°, the angular distance $\delta\varphi_2$ of the second LPG is 1.5°, and the angular distance $\delta\varphi_3$ of the third LPG is 1.8°. The graph in FIG. 10 shows the intensity patterns at three different distances from the three LPGs: 0.50 meters, 0.65 meters, and 0.80 meters. As shown in FIG. 10, the line pattern generated by the overlap of the three LPGs is different at different distances, and an observation of a target object at one distance can be distinguished from an observation of the target object at another distance based on the observed intensity pattern across the target object.

Example Data Processing System

Figure 11:
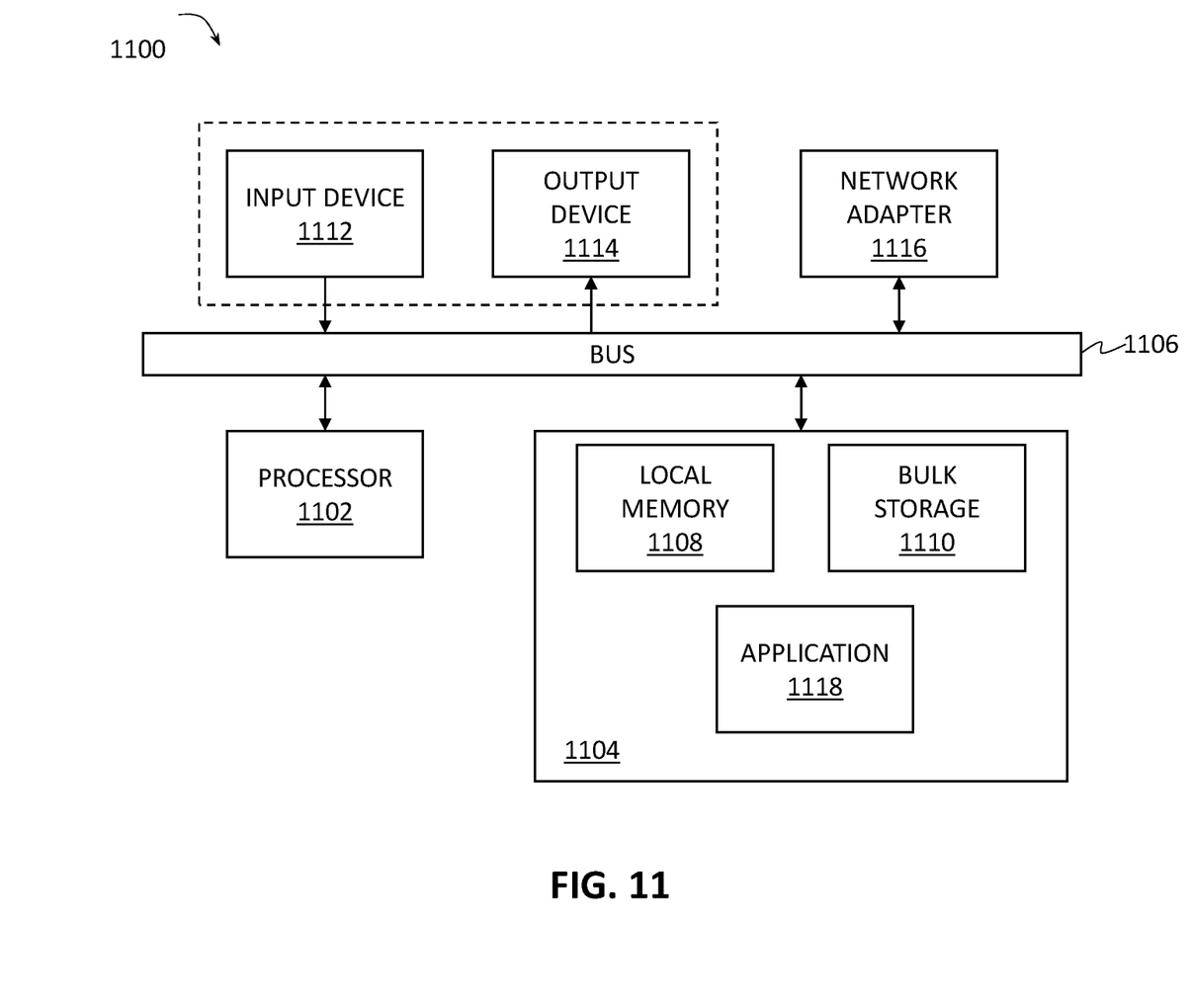
FIG. 11 provides a block diagram illustrating an example data processing system for use in the distance measurement system of FIG. 8, according to some embodiments of the present disclosure.

FIG. 11 provides a block diagram illustrating an example data processing system 1100 that may be configured to implement at least portions of distance measurement systems with described herein, e.g., of the distance measuring systems as described with reference to FIGS. 5-10, according to some embodiments of the present disclosure.

As shown in FIG. 11, the data processing system 1100 may include at least one processor 1102, e.g. a hardware processor, coupled to memory elements 1104 through a system bus 1106. As such, the data processing system may store program code within memory elements 1104. Further, the processor 1102 may execute the program code accessed from the memory elements 1104 via a system bus 1106. In one aspect, the data processing system may be implemented as a computer that is suitable for storing and/or executing program code. It should be appreciated, however, that the data processing system 1100 may be implemented in the form of any system including a processor and a memory that is capable of performing the functions described within this disclosure.

In some embodiments, the processor 1102 can execute software or an algorithm to perform the activities as discussed in this specification, in particular activities related to measuring distances, such as various techniques implemented by the distance measurement systems described herein. The processor 1102 may include any combination of hardware, software, or firmware providing programmable logic, including by way of non-limiting example a microprocessor, a DSP, a field-programmable gate array (FPGA), a programmable logic array (PLA), an integrated circuit (IC), an application specific IC (ASIC), or a virtual machine processor. The processor 1102 may be communicatively coupled to the memory element 1104, for example in a direct-memory access (DMA) configuration, so that the processor 1102 may read from or write to the memory elements 1104.

In general, the memory elements 1104 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory elements discussed herein should be construed as being encompassed within the broad term "memory." The information being measured, processed, tracked or sent to or from any of the components of the data processing system 1100 could be provided in any database, register, control list, cache, or storage structure, all of which can be referenced at any suitable timeframe. Any such storage options may be included within the broad term "memory" as used herein. Similarly, any of the potential processing elements, modules, and machines described herein should be construed as being encompassed within the broad term "processor." The distance measurement system 1020 shown in FIG. 10 can also include suitable interfaces for receiving, transmitting, and/or otherwise communicating data or information in a network environment so that they can communicate with external data processing systems.

In certain example implementations, mechanisms for implementing distance measurement systems s as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as e.g. the memory elements 1104 shown in FIG. 11, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g. the processor 1102 shown in FIG. 11, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

The memory elements 1104 may include one or more physical memory devices such as, for example, local memory 1108 and one or more bulk storage devices 1110. The local memory may refer to RAM or other non-persistent memory device(s) generally used during actual execution of the program code. A bulk storage device may be implemented as a hard drive or other persistent data storage device. The data processing system 1100 may also include one or more cache memories (not shown) that provide temporary storage of at least some program code in order to reduce the number of times program code must be retrieved from the bulk storage device 1110 during execution.

As shown in FIG. 11, the memory elements 1104 may store an application 1118. In various embodiments, the application 1118 may be stored in the local memory 1108, the one or more bulk storage devices 1110, or apart from the local memory and the bulk storage devices. It should be appreciated that the data processing system 1100 may further execute an operating system (not shown in FIG. 11) that can facilitate execution of the application 1118. The application 1118, being implemented in the form of executable program code, can be executed by the data processing system 1100, e.g., by the processor 1102. Responsive to executing the application, the data processing system 1100 may be configured to perform one or more operations or method steps described herein.

Input/output (I/O) devices depicted as an input device 1112 and an output device 1114, optionally, can be coupled to the data processing system. Examples of input devices may include, but are not limited to, a keyboard, a pointing device such as a mouse, or the like. Examples of output devices may include, but are not limited to, a monitor or a display, speakers, or the like. In some embodiments, the output device 1114 may be any type of screen display, such as plasma display, liquid crystal display (LCD), organic light emitting diode (OLED) display, electroluminescent (EL) display, or any other indicator, such as a dial, barometer, or light emitting diode (LED). In some implementations, the system may include a driver (not shown) for the output device 1114. Input and/or output devices 1112, 1114 may be coupled to the data processing system either directly or through intervening I/O controllers.

In an embodiment, the input and the output devices may be implemented as a combined input/output device (illustrated in FIG. 11 with a dashed line surrounding the input device 1112 and the output device 1114). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 1116 may also, optionally, be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 1100, and a data transmitter for transmitting data from the data processing system 1100 to said systems, devices and/or networks. Modems, cable modems, and Ethernet cards are examples of different types of network adapter that may be used with the data processing system 1100.

OTHER IMPLEMENTATION NOTES, VARIATIONS, AND APPLICATIONS

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

It should be appreciated that the electrical circuits of the accompanying drawings and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

In some embodiments, any number of electrical circuits of the accompanying drawings may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer readable storage medium comprising instructions to allow a processor to carry out those functionalities.

In some embodiments, the electrical circuits of the accompanying drawings may be implemented as stand-alone modules (e.g., a device with associated components and circuitry configured to perform a specific application or function) or implemented as plug-in modules into application specific hardware of electronic devices. Note that some embodiments of the present disclosure may be readily included in a system on chip (SOC) package, either in part, or in whole. An SOC represents an integrated circuit (IC) that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the distance measurement system may be implemented in one or more silicon cores in Application Specific Integrated Circuits (ASICs), Field Programmable Gate Arrays (FPGAs), and other semiconductor chips.

It is also important to note that the functions related to the distance measurement system, e.g., those summarized in the one or more processes shown in FIGS. 5-11, illustrate only some of the possible functions that may be executed by, or within, the distance measuring system. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of any of the devices and systems described herein may also be implemented with respect to the methods or processes described herein and specifics in the examples may be used anywhere in one or more embodiments.

The invention claimed is:

1. A system for measuring a distance to an object, the system comprising:
   a first pattern generator configured to emit a first pattern, the first pattern having a first angular distance between adjacent bright portions in the first pattern;
   a second pattern generator configured to emit a second pattern, the second pattern having a second angular distance between adjacent bright portions in the second pattern; and
   a processor configured to:
      receive at least one image of the first pattern and the second pattern;
      identify, in the at least one image, a target object illuminated by the first pattern and the second pattern,
      identify, in the at least one image, a background illuminated by the first pattern and the second pattern,
      determine a first phase difference between the target object illuminated by the first pattern and the background illuminated by the first pattern,
      determine a second phase difference between the target object illuminated by the second pattern and the background illuminated by the second pattern, and
      calculate a distance to the target object based on the first phase difference and the second phase difference.

2. The system of claim 1, wherein the at least one image of the first pattern and the second pattern comprises a first image of the first pattern and a second image of the second pattern.

3. The system of claim 2, wherein the processor is configured to:
   determine the first phase difference in the first image, the first phase difference
   describing a difference in phase between a first portion of the first pattern projected on the target object and a second portion of the first pattern projected on the background;
   determine the second phase difference in the second image, the second phase difference describing a difference in phase between a first portion of the second pattern projected on the target object and a second portion of the second pattern projected on the background.

4. The system of claim 1, wherein calculating the distance to the target object comprises calculating L according to the following equation:

$$\Delta\alpha = \left(\frac{2\pi b_1}{\delta\varphi_1} - \frac{2\pi b_2}{\delta\varphi_2}\right)(L^{-1} - L_0^{-1})$$

wherein $\Delta\alpha$ is the difference between the first phase difference and the second phase difference, b1 is a first distance from the first pattern generator to a camera, b2 is a second distance from the second pattern generator to the camera, $\delta\varphi_1$ is the first angular distance, $\delta\varphi_2$ is the second angular distance, and L0 is a distance to the background.

5. The system of claim 1, wherein the first pattern generator comprises a light source and a first grating assembly, the second pattern generator comprises the same light source and a second grating assembly, and the first angular distance is different from the second angular distance.

6. The system of claim 1, wherein the first pattern generator comprises a first light source and a first grating, the second pattern generator comprises a second light source and a second grating.

7. The system of claim 1, wherein the first pattern comprises a series of horizontal or vertical lines separated by the first angular distance, and the second pattern comprises a series of horizontal or vertical lines separated by the second angular distance.

8. The system of claim 1, wherein the first pattern comprises a first grid with a first plurality of dots, wherein adjacent dots in a first direction across the first grid are separated by the first angular distance, and the second pattern comprises a second grid with a second plurality of dots, wherein adjacent dots in a second direction across the second grid are separated by the second angular distance.

9. The system of claim 1, wherein the first pattern comprises a first set of concentric circles with two adjacent circles separated by the first angular distance, and the first pattern comprises a second set of concentric circles with two adjacent circles separated by the second angular distance.

10. A method for measuring a distance to an object, the method comprising:
receiving at least one image of a target object illuminated by a first pattern and a second pattern, the first pattern emitted by a first pattern generator and the first pattern having a first angular distance between adjacent bright portions in the first pattern, and the second pattern emitted by a second pattern generator and the second pattern having a second angular distance between adjacent bright portions in the second pattern;
identifying, in the at least one image, the target object illuminated by the first pattern and the second pattern;
identifying, in the at least one image, a background illuminated by the first pattern and the second pattern;
determining a first phase difference between the target object illuminated by the first pattern and the background illuminated by the first pattern;
determining a second phase difference between the target object illuminated by the second pattern and the background illuminated by the second pattern; and
calculating a distance to the target object based on the first phase difference and the second phase difference.

11. The method of claim 10, wherein the at least one image of the first pattern and the second pattern comprises a first image of the first pattern and a second image of the second pattern, and calculating the distance to the target object comprises:
determining the first phase difference in the first image, the first phase difference describing a difference in phase between a first portion of the first pattern projected on the target object and a second portion of the first pattern projected on the background; and
determining the second phase difference in the second image, the second phase difference describing a difference in phase between a first portion of the second pattern projected on the target object and a second portion of the second pattern projected on the background.

12. The method of claim 10, wherein calculating the distance to the target object comprises calculating L according to the following equation:

$$\Delta\alpha = \left(\frac{2\pi b_1}{\delta\varphi_1} - \frac{2\pi b_2}{\delta\varphi_2}\right)(L^{-1} - L_0^{-1})$$

wherein $\Delta\alpha$ is the difference between the first phase difference and the second phase difference, b1 is a first distance from the first pattern generator to a camera, b2 is a second distance from the second pattern generator to the camera, $\delta\varphi_1$ is the first angular distance, $\delta\varphi_2$ is the second angular distance, and L0 is a distance to the background.

13. The method of claim 10, further comprising:
instructing the first pattern generator to emit the first pattern;
instructing the second pattern generator to emit the second pattern; and
instructing a camera to capture the at least one image.

14. The method of claim 10, wherein the first pattern comprises a series of horizontal or vertical lines separated by the first angular distance, and the second pattern comprises a series of horizontal or vertical lines separated by the second angular distance.

15. The method of claim 10, wherein the first pattern comprises a first grid with a first plurality of dots, wherein adjacent dots in a first direction across the first grid are separated by the first angular distance, and the second pattern comprises a second grid with a second plurality of dots, wherein adjacent dots in a second direction across the second grid are separated by the second angular distance.

16. The method of claim 10, wherein the first pattern comprises a first set of concentric circles with two adjacent circles separated by the first angular distance, and the first pattern comprises a second set of concentric circles with two adjacent circles separated by the second angular distance.

17. A non-transitory computer readable medium storing instructions for measuring a distance to an object, the instructions, when executed by a processor, cause the processor to:
receive at least one image of a target object illuminated by a first pattern and a second pattern, the first pattern emitted by a first pattern generator and the first pattern having a first angular distance between adjacent bright portions in the first pattern, and the second pattern emitted by a second pattern generator and the second pattern having a second angular distance between adjacent bright portions in the second pattern;
identify, in the at least one image, the target object illuminated by the first pattern and the second pattern;
identify, in the at least one image, a background illuminated by the first pattern and the second pattern;
determine a first phase difference between the target object illuminated by the first pattern and the background illuminated by the first pattern;
determine a second phase difference between the target object illuminated by the second pattern and the background illuminated by the second pattern; and
calculate a distance to the target object based on the first phase difference and the second phase difference.

18. The non-transitory computer readable medium of claim 17, wherein the instructions further cause the processor to:
instruct the first pattern generator to emit the first pattern;
instruct the second pattern generator to emit the second pattern; and
instruct a camera to capture the at least one image.

19. The non-transitory computer readable medium of claim 17, wherein the first pattern comprises a series of horizontal or vertical lines separated by the first angular distance, and the second pattern comprises a series of horizontal or vertical lines separated by the second angular distance.

20. The non-transitory computer readable medium of claim 17, wherein the first pattern comprises one of a grid with a plurality of dots, wherein adjacent dots in a first direction across the grid are separated by the first angular distance; and a set of concentric circles with two adjacent circles separated by the first angular distance.

* * * * *